INVENTORS. R. C. HOYLER
A. KOSCINSKI
W. B. PERKINSON
BY M. A. Rackman
ATTORNEY

United States Patent Office 3,428,754

Patented Feb. 18, 1969

3,428,754

CONFERENCE SYSTEM WHEREIN TRANSMITTING AND RECEIVING TERMINALS ARE SEPARATELY CONNECTED TO A TALKING BUS

Robert C. Hoyler, New Shrewsbury, and Anthony Koscinski, Sayreville, N.J., and William B. Perkinson, Columbus, Ohio, assignors to Bell Telephone Laboratories, Incorporated, New York, N.Y., a corporation of New York Filed Aug. 6, 1965, Ser. No. 477,709

U.S. Cl. 179—18 2 Claims

Int. Cl. H04m 3/56

ABSTRACT OF THE DISCLOSURE

A conference arrangement for a large number of telephone lines is disclosed. The transmitting portion of each line circuit is connected to a common talking bus only in a discrete time slot of a recurrent cycle while the receiving portion of that line circuit is connected to the bus only during all other time slots of the cycle. A ring counter defines the time slots and enables PNPN switches to connect the transmitting and receiving portions to the bus.

This invention relates to conference circuits and more particularly to circuits for conferencing large numbers of long lines.

There are many schemes known in the prior art for conferencing a number of telephone lines. Consider a four-wire system in which each line includes a transmitter and a receiver. The simplest way to conference the various lines is to connect all of the transmitting and receiving portions of the lines to respective windings on a transformer. Voice signals applied to the transformer by the transmitter of one of the lines result in signals being induced in all of the receiver windings. Such a scheme introduces an echo problem. Consider a signal originating at one of the stations and transmitted over the respective transmitting portion of the line to the transformer core. Signals are induced in all of the receiver windings and are received by all of the stations. The station at which the signal is derived also receives the induced signal since all of the transmit and receive windings are connected in parallel on the single transformer core. Thus an echo is received at the originating station. This echo is not serious if short lines are conferenced together since the echo signal is received almost simultaneously with the signal origination. However, if long lines are conferenced together the echo may be intolerable. Suppose that 100 milliseconds are required for a signal to be transmitted between the station and the transformer. Since it requires 100 milliseconds for a signal to travel in either direction the echo is not heard until 200 milliseconds have elapsed since the signal transmission from the station. This delay may seriously impair the operating characteristics of the system.

To prevent echo, other arrangements are known in the art. For example, costly echo suppressors may be used. Alternatively, it is possible to couple the transmitter of each line to the receivers of only the other lines. Thus, any signal transmitted from a station is fed to only the other stations with no echo being returned to the originating station. The problem with such a scheme however is that an individual circuit is required for each line to couple its transmitter to the receivers of all other lines, and if many lines must be conferenced together the number of these connections may be so great that the cost of the system may be prohibitive.

It is a general object of this invention to conference a large number of long lines in such a manner that echoes are eliminated with a minimum of circuitry.

In accordance with the principles of the invention a single circuit is used to conference together all of the lines. The transmitting and receiving portions of each of the lines are connected to this common circuit. Although the transmitting and receiving portions of each line are thus connected to the same common circuit, echoes are completely eliminated. This is accomplished by utilizing a time division switching technique, although as will become apparent the switching scheme employed is considerably different from those employed in conventional time division switching systems.

The common circuitry includes a single talking bus to which the transmitting and receiving portions of each line are connected. The transmitter of each line is connected to the bus through a sampler, and the receiver of each line is connected to the bus through an integrator. Each line is assigned a different time slot in a complete cycle and the respective sampler connects the transmitter to the bus in only the assigned time slot. On the other hand, the receiver of each line operates during all time slots except the one assigned to the line. Consider for example a 20-line system in which 20 time slots comprise a complete cycle. Time slot $i$ is assigned to line $i$ and the sampler connecting the transmitter of line $i$ to the bus operates only during time slot $i$. The receiver operates only during the other 19 time slots. During these other 19 time slots the samplers of the other 19 lines are operated in succession and 19 signal samples, one from each of the other lines, appear on the talking bus. These samples are integrated by the integrator connecting the receiver of line $i$ to the bus in order that a continuous signal appear on the receive portion of the line. During time slot $i$ the sampler of line $i$ is operated in order that a sample of the signal originating at station $i$ be applied to the bus for transmission to the other 19 stations. At the same time the receiver of line $i$ is disabled. Thus the receiver of line $i$ receives a continuous signal which is derived from the samples delivered by the other 19 transmitters; but the composite signal has no component derived from the respective transmitter. Thus echoes are completely eliminated even though a single common circuit is used because the signal transmitted to the bus from each transmitter is not received by the respective receiver. Samples from each line are supplied to the bus at a rate sufficient for representing all frequencies in the voice band.

It is a primary feature of this invention to provide a talking bus to which the transmitter and receiver of each line are connected, with the transmitter of each line being operated only in a respective time slot and the receiver of each line being operated only in all other time slots.

Further objects, features and advantages of the invention will become apparent upon consideration of the following detailed description in conjunction with the drawing in which.

Figure 3:
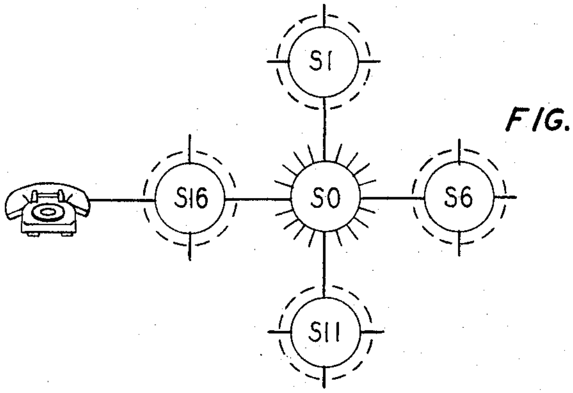
Figure 4:
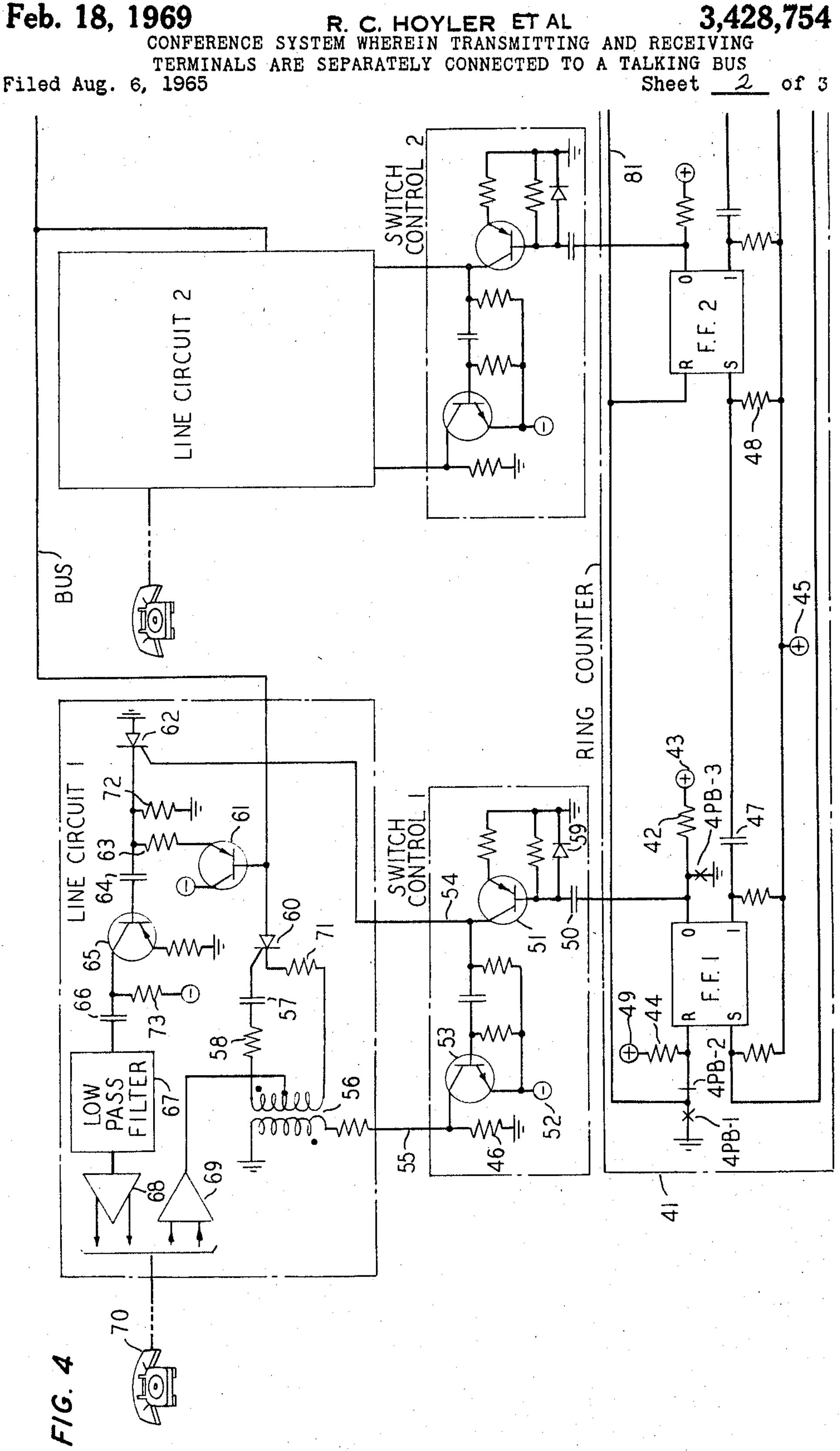
Figure 5:
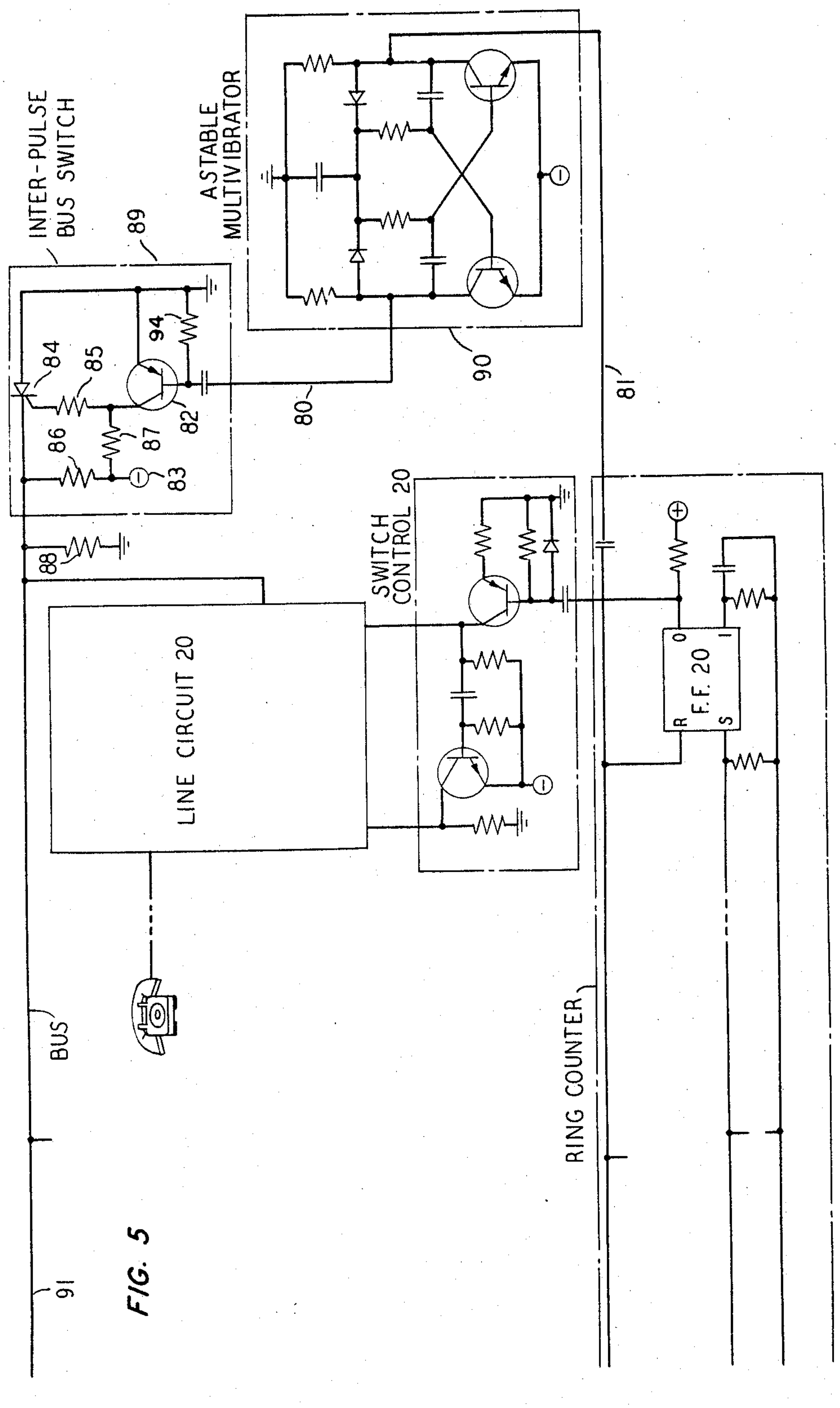

FIG. 3 shows how twenty-one 20-line systems may be combined to provide a 380-line conference; and FIGS. 4 and 5, with FIG. 4 being placed to the left of FIG. 5, show the detailed circuitry in an illustrative 20-line system.

Figure 1:
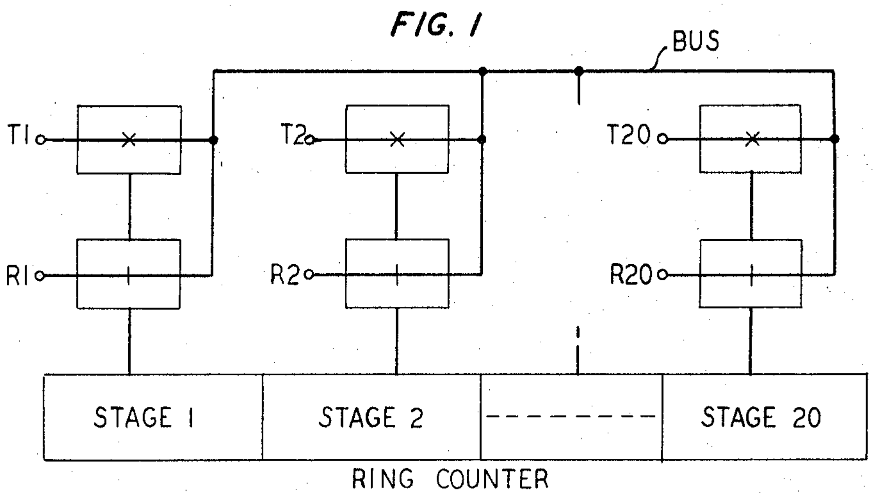
FIG. 1 depicts symbolically the principles of the invention applied to a 20-line system.

FIG. 1 illustrates symbolically the principles of the invention applied to a 20-line system. Each line includes transmit and receive terminals such as T1 and R1. A continuous signal is received from the line at terminal T1 and a continuous signal is returned to the line from terminal R1. Each receive terminal is connected through a normally closed switch to the system talking bus. Each transmit terminal is connected to the bus through a normally open switch.

The ring counter includes 20 stages only one of which is active at any time. The active stage rotates to the right and thus in each cycle each of the stages is active during only one time slot out of 20. When a particular stage is active the two switches it controls are operated. The shunt switch in the receive loop operates, disabling the receive circuit; the series switch in the transmit loop operates, enabling the transmit circuit. Thus, in time slot 1 transmit terminal T1 is the only one connected to the bus. The 19 receive terminals R2 through R20 are also connected to the bus but terminal R1 is not. In time slot 2 only transmit terminal T2 is connected to the bus and all receive terminals except R2 receive samples from the bus. Similar remarks apply to the other 18 time slots. In each of the 20 time slots a respective one of the transmit terminals is connected to the bus to provide a signal sample to the other 19 lines. The receive terminal of each line receives 19 samples from the bus in each cycle, the sample from the paired transmit terminal not being extended to the receive terminal.

Although not shown in FIG. 1, it is to be understood that each receive terminal is provided with an integrator for connecting it to the bus. Although 19 samples are delivered to each receive terminal during one cycle, the integrator smooths out the samples so that the signal received at each station is the composite waveform of the signals transmitted from the other 19 stations. Since the signal delivered to each station has no component derived from the signal transmitted by it, echoes are completely eliminated. If fewer than 20 lines are to be conferenced together, the system still operates as described; no signal is delivered to the bus from the unused lines and consequently the composite waveform delivered to each of the lines in use is unaffected by the unused lines.

Figure 2:
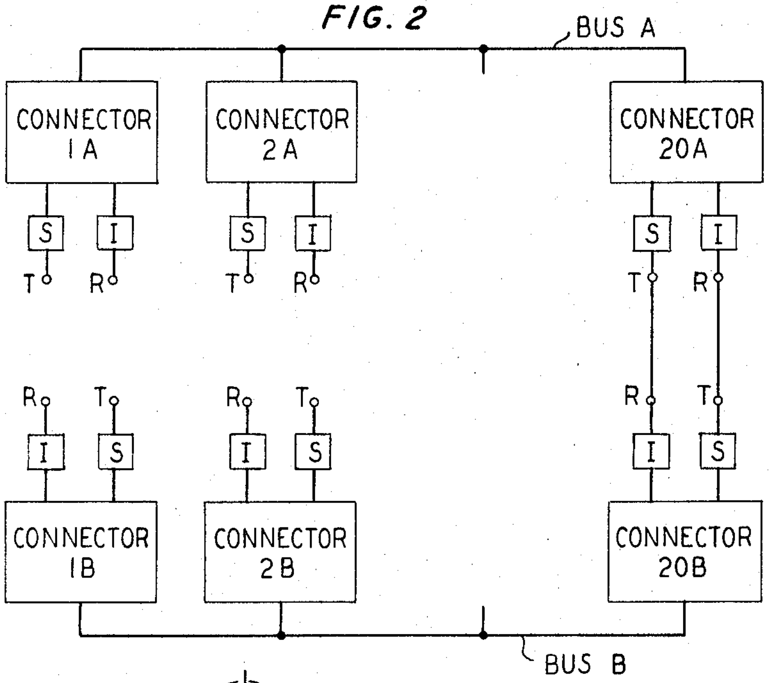
FIG. 2 shows how two 20-line systems may be combined to provide a 38-line conference.

FIG. 2 depicts symbolically how 38 lines may be conferenced together by two 20-line systems. In FIG. 2 each system is shown in a manner slightly different from that in FIG. 1. Only 19 station lines are coupled to each bus through respective connectors. Connector 1A, for example, connects to bus A the transmit and receive terminals of a respective line. The transmit terminal is connected through a sampler S, which operates during only one time slot of the 20 associated with bus A, and the receive terminal is connected through an integrator I to bus A only during the other 19 time slots. The system of FIG. 2 includes two self-contained and independent 20-line systems although a common ring counter may be used for both if desired. Continuous signals appear at the transmit and receive terminals of each line. Thus, as far as connector 20A is concerned, the signal at the respective transmit terminal is derived from a respective line and the signal applied to the receive terminal is delivered to the same line. Similar remarks apply to the transmit and receive terminals associated with connector 20B, the twentieth connector in the second 20-line system. By merely connecting the twentieth transmit terminal in one system to the twentieth receive terminal in the other and the twentieth receive terminal in the first system to the twentieth transmit terminal in the second, a 38-line conference may be established. Only 38 lines may be conferenced together since one line in each system is used to interconnect the two systems. Each system operates independently since continuous signals appear at the transmit and receive terminals which are tied together.

It should be noted that a similar result could be obtained if a single 38-stage ring counter is provided with 38 time slots comprising each cycle. However the greater the number of time slots in each cycle, the less is the time available for the sampling operations. For example, suppose that the transmit terminal of each line must be sampled at a 10 kc. rate for faithful reproduction of the sampled waveforms. In a 20-line system a 200 kc. rate is required, and 5 microseconds are available for sampling each transmit terminal. In a 38-line system, however, if each transmit terminal is to be sampled at a 10 kc. rate the ring counter must operate at a frequency of 380 kc. This allows only slightly more than 2.6 microseconds for each transmit terminal to be sampled. In a particular application it may be more advantageous to tie two or more smaller capacity systems together rather than to provide a single larger capacity system.

FIG. 3 shows how twenty-one 20-line systems may be combined to provide a 380-line conference. No stations are connected to the central 20-line system S0. Instead, each of the 20 transmit-receive terminal pairs is connected to one of the transmit-receive pairs of a respective one of the other twenty 20-line systems. Nineteen lines are connected to the other 19 transmit-receive terminal pairs in each of the other twenty systems, of which only systems S1, S6, S11 and S16 are shown in the drawing. In this manner (19)(20) or 380 lines may be conferenced together. It should be noted that a signal transmitted, for example, from a line connected to system S1 to a line connected to system S11, is sampled and integrated three times. The signal transmitted from the line connected to system S1 is sampled when it is applied to the talking bus of system S1 and then integrated before it is applied to the receive terminal which is connected directly to one of the transmit terminals of system S0. The signal is then sampled a second time for application to the bus of system S0 and integrated in order that a continuous signal appear on the receive terminal-transmit terminal connection between systems S0 and S11. Finally, the continuous signal applied to system S11 from system S0 is sampled a third time for application to the talking bus in system S11 and integrated once again for application to the receive terminal connected to the receiving station. Since the sampling and integrating operations introduce very little distortion, the transmission characteristics of the system are good.

FIGS. 4 and 5 show the detailed circuitry in an illustrative 20-line system. Each 4-wire line is connected to a respective line circuit. A respective switch control connects the line circuit to a respective one of the 20 ring counter stages. The single talking bus is connected to all of the line circuits, each line circuit including a sampler for connecting the transmit portion of the respective line to the bus and a receiver-integrator for connecting the receive portion of the respective line to the bus. The interpulse bus switch 89 is used to ground the bus at the end of each time slot and functions to further improve the echo suppression. If a residual signal should remain on the bus after each sampling operation, the signal would be returned to the disabled receiver when it is once again enabled during the next time slot. By grounding the bus after each sample is delivered to the 19 operating receivers, no signal remains on the bus to be returned to the receiver paired with the previously operated transmitter, when that receiver is connected to the bus at the beginning of the next time slot. An astable multivibrator 90 oscillates at a 200 kc. rate and controls the operation of both the ring counter and the interpulse bus switch.

Consider first the operation of ring counter 41. Astable multivibrator 90 applies a negative step to conductor 81 once every 5 microseconds. This step is coupled to the reset terminal of each of the 20 flip-flops in the counter. The negative pulse applied to the reset terminal of each flip-flop sets it in the 0 state. When a flip-flop is in the 0 state the 0 output is effectively open circuited and the positive potential of the connected source, such as source 43, is extended to the respective switch control, such as switch control 1. Only one of the flip-flops was previously in the 1 state, at which time its 1 output was held at the positive potential of source 45. When all of the flip-flops are reset by the pulse from the astable multivibrator this previously set flip-flop is the only one whose 1 output terminal goes from a positive potential to ground. The resulting negative step is applied to the set terminal of the succeeding flip-flop to switch it to the 1 state. When in the 1 state the 0 output of a flip-flop is at ground potential and this potential is extended to the respective switch control rather than a positive potential.

When the system is first put into operation it is necessary that only one flip-flop be in the 1 state. By operating pushbuttons 4PB–1 through 4PB–3 all flip-flops except the first are reset. When the pushbuttons are first operated ground potential is applied through contacts 4PB–1 to the reset terminals of all flip-flops except the first. Conductor 81 is normally held at a positive potential extended from source 49 through resistor 44 and contacts 4PB–2. When contacts 4PB–2 open and contacts 4PB–1 close conductor 81 is grounded. The resulting negative step resets flip-flops 2 through 20. Since contacts 4PB–2 open the negative step is not applied to the reset terminal of flip-flop 1. Flip-flop 1 is of the type where a ground potential applied to the 0 output forces the flip-flop to the 1 state. Since contacts 4PB–3 are closed and the 0 output is grounded the flip-flop is forced to the 1 state with a positive potential appearing at the 1 output terminal. When the three pushbuttons are released the negative pulses on conductor 81 are once again extended to the reset terminals of all 20 flip-flops. Before the first pulse is applied only flip-flop 1 is in the 1 state. The first pulse from the multivibrator tends to reset each of the 20 flip-flops although only flip-flop 1 actually switches from the 1 to the 0 state. The 1 output of this flip-flop goes from a positive potential to ground. The negative step at the output is delayed by the delay circuit comprised of capacitor 47 and resistor 48. The resulting negative pulse extended to the set terminal of flip-flop 2 remains for a short period after the pulse on conductor 81 has terminated. Consequently flip-flop 2 is set in the 1 state. The next pulse from the multivibrator again tends to reset all flip-flops although only flip-flop 2 actually switches from the 1 to the 0 state. The negative pulse transmitted to the set terminal of flip-flop 3 switches this flip-flop to the 1 state, etc. This process continues at a 200 kc. rate. Although a particular ring counter is shown others may be used in the circuit. All that is required is that the conductor extended from each stage to the respective switch control be positive in potential during 19 of the 20 time slots when the stage is in the 0 state and be at ground potential during the remaining time slot when the stage is in the 1 state.

The 20 switch controls are all identical and their operations may be understood by considering switch control 1. When flip-flop 1 is in the 0 state conductor 54 is at a negative potential and conductor 55 is at ground. The negative potential on conductor 54 allows the receiver circuitry associated with station 70 to be connected to bus 91, and the ground potential on conductor 55 prevents the transmitting portion of the line from delivering a sample to the bus. When flip-flop 1 first switches from the 1 to the 0 state a positive pulse is transmitted through capacitor 50. The pulse is shorted through diode 59, and transistor 51 is not forward biased. Thus while flip-flop 2 is in the 0 state the negative potential of source 52 is extended to conductor 54. Since the negative potential is extended to both the base and emitter terminals of transistor 53 this transistor similarly does not conduct and ground potential is extended through resistor 46 to conductor 55.

When the flip-flop switches to the 1 state a negative step is transmitted through capacitor 50. The capacitor is of such a value that although the step decays, a negative potential appears at the base of transistor 51 for the full five-microsecond interval that flip-flop 1 remains in the 1 state. Since diode 59 is reverse biased the pulse is not shorted to ground. Transistor 51 conducts and ground potential is extended to conductor 54. At the same time the ground potential on conductor 54 forward biases the base-emitter junction of transistor 53. This transistor conducts and the negative potential of source 52 is extended through the transistor to conductor 55. Thus during the five microseconds of each 100-microsecond cycle that flip-flop 1 is in the 1 state conductor 54 is grounded rather than being held at a negative potential, and conductor 55 is held at a negative potential rather than being grounded.

During the 95 microseconds in each cycle that flip-flop 1 is in the 0 state a ground potential appears on conductor 55 and PNPN switch 60 remains off. Although the transmitting portion of the line from station 70 transmits a signal through amplifier 69 to the midpoint of the secondary winding of transformer 56, since PNPN switch 60 is off no sample is transmitted to bus 91. However, the receive portion of line circuit 1 does operate during these 95 microseconds. With conductor 54 at a negative potential PNPN switch 62 is held off. As will be described below bus 91 is maintained at a slightly negative potential. Since the emitter of transistor 61 is extended through resistors 63 and 72 to ground the emitter-base junction of transistor 61 is forward biased. Samples delivered to the bus from the other line circuits are extended through emitter follower 61, resistor 63 and capacitor 64 to the base of transistor 65. During the 95 microseconds that PNPN switch 62 is off the negative potential on bus 91 is extended through transistor 61, resistor 63 and capacitor 64 to the base of transistor 65 to maintain it conducting. Capacitor 64 is sufficiently small in magnitude such that while the bias potential at the base of transistor 65 decays to ground, a negative potential persists for 95 microseconds to keep the transistor on. Transistor 65 is provided to amplify samples received from bus 91. The samples are coupled to the low-pass filter by capacitor 66 and resistor 73. The high frequency components introduced by the switching of the various elements are removed and the sampled signal integrated, by low-pass filter 67. The resulting continuous signal is amplified by amplifier 68 and transmitted to station 70.

When flip-flop 1 first switches to the 1 state conductor 54 goes from a negative potential to ground. Since the cathode of PNPN switch 62 is at a negative potential the PNPN switch is triggered on. It is the turning on of this switch that disables the receiving equipment in line circuit 1. The samples delivered through transistor 61 are shorted to ground through the switch and are not extended to the base of transistor 65. While emitter-follower 61 still operates (the emitter-followers are provided in the line circuits in order that the 20 receiving circuits not load bus 91), the sample supplied by the transmitting section of line circuit 1 to bus 91 is not extended back to station 70.

During the five microseconds that flip-flop 1 is in the 1 state conductor 55 is at negative potential. Since a negative step appears on conductor 55, and the windings of transformer 56 are such that pulses transmitted through it are inverted, the trigger terminal of PNPN switch 60 is positive with respect to its cathode. The transformer characteristics and the magnitudes of resistor 58 and capacitor 57 are such that although the pulse decays a voltage difference continuously appears between the control and cathode terminals of the switch during the five microseconds that flip-flop 1 is in the 1 state. With PNPN switch 60 conducting the signal from amplifier 69 is transmitted through both halves of the secondary winding and the switch to bus 91, to be delivered to the receiving circuits in the other 19 line circuits. It is to be recalled that bus 91 is held at a slightly negative potential. In order that PNPN switch 60 be forward biased the output terminal of amplifier 69 is held at a more negative potential. The center tap arrangement of transformer 56 is used in order that the signal delivered by amplifier 69 not be extended to conductor 55 to erroneously affect the operation of switch control 1. Since current flows through both the control and cathode terminals of the switch to bus 91 oppositely poled voltages are induced in the primary winding of the transformer. These oppositely poled voltages cancel each other and the potential of conductor 55 is controlled solely by the operation of transistor 53.

At the end of the five microsecond interval during which flip-flop 1 is in the 1 state both PNPN switches 60 and 62 turn off. The ground potential on conductor 54 not only triggers switch 62 but in addition holds it on. The current through the switch flows through resistor 63 and transistor 61 to the slightly negative bus 91. Resistor 63 is of sufficient magnitude such that the current through the switch is insufficient to hold it conducting. Consequently when conductor 54 switches back to a negative potential at the end of the respective time slot PNPN switch 62 turns off so that the receiving circuit in line circuit 1 functions once again to direct the next 19 samples on the bus to station 70. Similarly, the negative pulse on conductor 55 controls not only the turning on of switch 60 but in addition its holding. Resistor 71 is sufficiently high in magnitude such that the bias current through switch 60 is less than the holding current required to maintain the switch on. Consequently at the end of the five microsecond negative pulse on conductor 55 the switch turns off to disconnect the transmitting portion of the line from the bus.

As described above bus 91 is held at a slightly negative potential in order that the emitter-follower in each of the line circuits be biased to conduction. The negative potential on the bus is derived from source 83, current flowing from ground through resistors 88 and 86 to the source. Resistor 88 provides the path through which the current samples delivered to the bus flow to ground. Although the transmitter of each line circuit is turned on for five microseconds and the receiver is turned off for five microseconds, bus 91 is grounded in order to eliminate any residual signal before the next time slot. Toward the end of each five microsecond interval the astable multivibrator switches states and a negative pulse appears on conductor 80. At this time a positive pulse appears on conductor 81, connected to the other side of the multivibrator, but the positive pulse has no effect on the ring counter operation. Toward the end of each five-microsecond interval, e.g., after 4.5 microseconds have elapsed, the astable multivibrator switches states. Transistor 82 is normally off as is PNPN switch 84. The transistor is off because the base is connected through resistor 94 to ground and the PNPN switch is off because the negative potential of source 83 is extended through resistors 87 and 85 to the control terminal. When the negative pulse appears on conductor 80 transistor 82 turns on since its emitter-base junction is forward biased. The collector of the transistor is shorted to ground and this ground potential, extended through resistor 85 to the control terminal of PNPN switch 84, turns the latter on. Bus 91 is shorted through the switch to ground and all residual signals on the bus are canceled. It is the ground potential at the collector of transistor 82 which holds switch 84 on. After .5 microsecond has elapsed the astable multivibrator switches once again to advance the ring counter. At the same time a positive step is applied to conductor 80 and transistor 82 turns off. The collector of the transistor is once again held at the negative potential of source 83. Although current flows through switch 84 and resistor 86 to negative source 83 when the switch is held on, resistor 86 is sufficiently large in magnitude such that the current is less than the holding current required to maintain the switch conducting. Consequently when transistor 82 turns off PNPN switch 84 similarly turns off in order that the next sample applied to bus 91 not be shorted through the switch to ground. At this time a sample is delivered from the transmitting portion of the second line to the bus and the receiver circuitry in line circuit 2 is disabled. The sample appears on the bus for only 4.5 microseconds since when the astable multivibrator switches state the bus is once again shorted to ground. The bus remains shorted to ground for .5 microsecond after which time the astable multivibrator switches states. PNPN switch 84 turns off and the negative pulse on conductor 81 advances the ring counter. This process continues at a 200 kc. rate with a five-microsecond sample (or more accurately a 4.5-microsecond sample since bus 91 is shorted for .5 microsecond in each time slot) being delivered to the bus by the transmitting portion of each line once in every 100 microseconds, and with the receiving portion of each line circuit receiving a continuous signal which is a composite of only the other 19 transmitted signal waveforms.

Although the invention has been described with reference to a specific embodiment it is to understood that the above-described arrangement is merely illustrative of the application of the principles of the invention. For example, a common bus amplifier could be provided to amplify the pulses on the bus instead of providing amplification of the continuous signal on each line, or alternate switching methods could be employed to achieve the same sampling or control functions. Numerous modifications may be made in the illustrative embodiment of the invention and other arrangements may be devised without departing from the spirit and scope of the invention.

What is claimed is:

1. A conference circuit for a plurality of lines, each of said lines including a transmitting portion and a receiving portion, comprising a common bus, clock means for identifying repetitive time intervals in each cycle of operation, each of said time intervals being associated with a respective one of said lines, means for connecting each of said transmitting portions to said common bus in the respective time interval, means for normally connecting each of said receiving portions to said common bus, means for disconnecting each of said receiving portions from said common bus in the respective time interval, means in each of said receiving portions for integrating the signals appearing on said common bus during the time intervals in which said each receiving portion is connected to said common bus and means connected to said common bus and operative at the end of each of said repetitive time intervals for removing residual signals on said common bus.

2. A conference circuit for a plurality of lines, each of said lines including a transmitting portion and a receiving portion, comprising a common bus, clock means for identifying repetitive time intervals in each cycle of operation, each of said time intervals being associated with a respective one of said lines, means for connecting each of said transmitting portions to said common bus in the respective time interval, means for normally connecting each of said receiving portions to said common bus, means for disconnecting each of said receiving portions from said common bus in the respective time interval, and means in each of said receiving portions for integrating the signals appearing on said common bus during the time intervals in which said each receiving portion is connected to said common bus; and wherein said clock means includes a ring counter having a number of stages equal to the number of said lines, each of said transmitting portion connecting means and each of said receiving portion disconnecting means includes a normally non-conducting PNPN switch, a plurality of switch control means each responsive to the energization of a respective stage in said ring counter for triggering and holding on the PNPN switch connecting means and the PNPN switch disconnecting means operative with the transmitting and receiving portions of a respective one of said lines, and means for biasing each of said PNPN switches such that said each PNPN switch turns off when the respective switch control means ceases to operate responsive to the de-energization of the respective ring counter stage.

References Cited

UNITED STATES PATENTS

| | | | |
|---|---|---|---|
| 2,515,726 | 7/1950 | Montani | 179—1 |
| 3,287,499 | 11/1966 | Brightman et al. | 179—1 |

KATHLEEN H. CLAFFY, *Primary Examiner.*

A. H. GESS, *Assistant Examiner.*